United States Patent [19]
Fahl

[11] Patent Number: 4,948,094
[45] Date of Patent: Aug. 14, 1990

[54] OUTLET VALVES

[75] Inventor: Richard L. Fahl, Fairfield, Ohio

[73] Assignee: Dover Corporation, New York, N.Y.

[21] Appl. No.: 392,084

[22] Filed: Aug. 9, 1989

[51] Int. Cl.$^5$ ............................................. F16K 1/00
[52] U.S. Cl. .................................. 251/149.6; 251/323
[58] Field of Search ............................ 251/323, 149.6; 137/315

[56] References Cited

U.S. PATENT DOCUMENTS

| | | | |
|---|---|---|---|
| 1,535,405 | 4/1925 | Ernst | 251/323 |
| 2,823,048 | 2/1958 | Hansen | 251/149.6 |
| 3,086,747 | 4/1963 | Saner | 251/149.7 X |
| 3,488,035 | 1/1970 | Budreck et al. | 251/323 |
| 4,040,456 | 8/1977 | De Frees | 251/323 X |
| 4,200,121 | 4/1980 | Walter et al. | 251/149.6 X |

FOREIGN PATENT DOCUMENTS 1306520  9/1962  France .......................... 251/323

Primary Examiner—Arnold Rosenthal
Attorney, Agent, or Firm—Kinney & Schenk

[57] ABSTRACT

An outlet valve comprising a unitary housing is described. An inlet end of the housing has a flange for attachment of the valve to the discharge conduit of a tote tank, and an outlet end of the housing has a flange for attachment of a dry disconnect coupler for delivery of product from the tank. A bridge member provides a sliding journal for the stem of a poppet assembly which is held in a closed position by a spring acting against the bridge. The bridge and poppet assembly can be removed for cleaning by removal of a snap ring which holds the bridge member in place in a bore in the housing. Cleaning is further facilitated by the opening of the groove into the bore being relatively wide. Clearance for mounting the dry disconnect coupler to the outlet end of the housing is provided by angling the inlet end of the housing relative to the remainder of the valve.

5 Claims, 1 Drawing Sheet

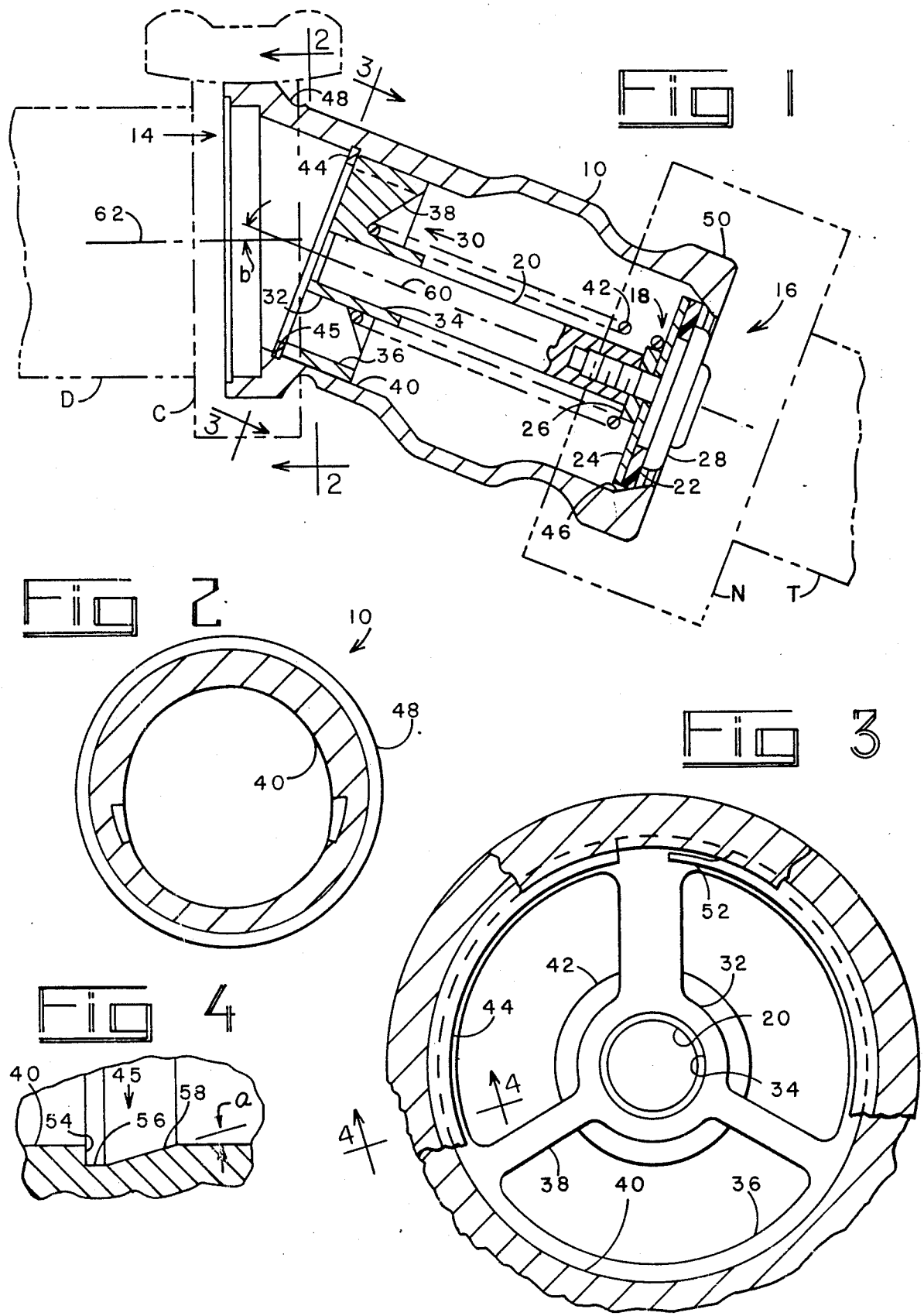

OUTLET VALVES

The present invention relates to improvements in outlet valves and more particularly to improvements in the cleanability of such valves.

While not so limited, in all aspects, the present invention is motivated by the requirements for outlet valves employed on portable tanks known as tote tanks.

For many years bulk, liquid products have been delivered to an end user in drums, the fifty-five gallon size being most common. Because of the difficulties in cleaning these drums the ability to reuse them is limited. Further, particularly where they have contained hazardous materials, their disposal can be a real problem.

This has led to the expanded use of tote tanks, i.e., rectangular which are filled with a liquid product, sealed by a suitable cover and delivered to an end user of the product. Paints and printing inks are representative of such products. The tote tank is provided with an outlet conduit having an outlet valve. The end user than connects a conduit, or tube to the outlet valve so that the product may flow, or be pumped to a machine where the product is used, as for example to a printing press.

After the product is depleted, the tote tank is returned to be filled with a further supply of liquid product. The tote tank is configured to facilitate its cleaning. Similarly the outlet valve must also be cleaned for reuse of the tote tank. Outlet valves heretofore employed for tote tanks have had the shortcoming of being difficult to clean.

Another problem encountered in prior outlet valves employed with tote tanks arises from the space constraints for mounting an outlet valve. This is to say that the outlet valve must not project from the tank, this is to say that the outlet valve must be within the vertical and horizontal outlines of the tote tank. It is also preferred practice employ a dry disconnect coupler in connecting a supply line conduit to the valve in order to minimize, and, preferably eliminate spillage of product when the supply line is connected and disconnected from the outlet valve. In many cases, it is necessary to angle the coupler connection relative to the tank's outlet conduit in order to provide sufficient clearance for the dry disconnect coupler.

Accordingly, the overall object of the invention is to improve the cleanability of outlet valves.

A more specific invention is to provide improved outlet valves meeting the requirements of tote tanks, These ends are attained by an outlet valve comprising a unitary housing which defines a fluid flow path therethrough. The housing has an inlet end and an outlet end and a valve seat adjacent the outlet end. A poppet assembly disposed within the housing includes sealing means adapted to sealingly engage the valve seat.

A bridge member, having a central hub in which a poppet stem is slidable, is mounted in a bore formed in the housing. Spring means, acting between the bridge member and the sealing sealing means, urge the sealing means to a closed position in which it is in sealing engagement with the valve seat.

Releasable means hold the bridge member in the bore in a position in which the spring means maintains the sealing means in its closed position. Upon release of the holding means, the internal components of the valve may be removed for cleaning thereof, as well as to enable cleaning of the flow path defining surface of the housing.

This outlet valve may be adapted for attachment to a tote tank having an outlet conduit. A flange at the inlet end of the housing facilitates attachment of the valve to the outlet conduit of a tote tank. Additionally the outlet end of the housing may have a flange which facilitates attachment of a dry disconnect coupler to the valve.

The bridge member may further comprise an outer rim slidably received by the housing bore and a plurality of spokes interconnecting the rim and hub. The releasable means advantageously comprise a groove formed in this bore and a snap ring removably inserted in the groove. The snap ring projects inwardly of the bore and is engaged by the rim to position the bridge member against the action of said spring means. The groove comprises an annuler portion extending radially outward from said bore, with the width of the opening of the groove into the bore being substantially greater than the width of the bottom of said groove. Preferably the groove comprises an annular crylindrical portion and a conical portion angled downstream therefrom towards said outlet end, such angle preferably being about 15 degrees.

Advantageously, the inner diameter of the snap ring is no greater than the inner diameter of said bridge rim and one end of the snap ring is recessed to provide a space for insertion of a prying member between the bore and the snap ring end to facilitate removal of the snap ring.

The housing bore, the valve seat and the coupler flange are formed concentrically of a first axis. the connector flange at the inlet end is formed concentrically of a second axis. The first axis is angled relative to the first axis, the angle, preferably being approximately 22.5 degrees.

The above and other related objects and features of the invention will be apparent from a reading of the following description of a preferred embodiment and the novelty thereof pointed out in the appended claims.

In the drawing:

FIG. 1 is a longitudinal section of an outlet valve embodying the present invention;

FIG. 2 is a section taken on line 2—2 in FIG. 1;

FIG. 3 is a section, on an enlarged scale, taken on line 3—3 in FIG. 1; and

FIG. 4 is a section taken on line 4—4 in FIG. 3, with certain valve components removed.

The present outlet valve comprises a unitary body or housing 10, preferably in the form of an integral metal casting, the particular metal employed being a matter within the abilities of one skilled in the art to economically meet such requirements as compatibility with the fluid to be controlled by the valve. Brass is an exemplary material. The housing 10 defines a fluid flow path from an inlet end 14 to an outlet end 16.

This fluid flow path is normally closed by a poppet valve comprising a poppet assembly 18 which includes a stem 20, a sealing disc 22, a reenforcing washer 24, and a positioning washer 26. A disc holder 28 is threaded into the stem 20 to hold the sealing disc 22 and washers 24, 26 in assembled relation on the stem.

A bridge member 30 supports the poppet assembly 18 for sliding movement within the flow path defined by the housing 10. The bridge member has a central hub 32 having a bore 34 in which the stem is slidably received. The hub 32 is connected to an outer rim 36 by radial spokes 38. The rim 36 is slidably received by a bore 40 formed in the housing 10. The downstream ends of the spokes 38 are angled to form a seat for a spring 42 which is telescoped over the end of the hub 32. The spring 42 is coiled about the stem 20 with its opposite end engaging the washer 24 and positioned by the washer 26.

The bridge member 30 is axially positioned relative to the bore 40 and the flow passageway through the housing 10, by a snap ring 44 which is received in an annular slot 45 extending outwardly of the bore 40. The spring 42 thus yieldingly holds the disc 22 in sealing engagement with a valve seat 46 formed just inside of the housing's outlet end 16.

The described valve is particularly adapted for and finds, at the present time, its greatest utility in use with portable tanks, known as tote tanks. These tote tanks are employed as supply containers for a wide variety of liquid products which are to be delivered by a conduit to an end application, as is more fully discussed above.

In FIG. 1, a discharge conduit from a tote tank (not shown) is indicated by phantom lines and designated by reference character D. The housing inlet end 14 is provided with a flange 48 which is configured to cooperate with a standard connector, also indicated by phantom lines and identified by reference character C. The inlet end 14 may thus be sealingly and disconnectably coupled to the outlet conduit D of the tote tank.

The outlet end 16 is similarly connected to a tube T and by a coupler N, both being indicated by phantom lines. The tube T may extend to a device in which the product from the tote tank is to be employed. The coupler N may be a commercially available type, well known in the art, and characterized by the provision of a poppet valve which prevents flow of liquid from the tube T when it is disconnected from the outlet valve. The poppet valve assembly 18 cooperates with the coupler N and the poppet valve thereof to the end that the outlet end 16 can be connected and disconnected from the tube T with little or no leakage. The coupler N is commonly referenced as a dry disconnect coupler.

The discharge end 16 is provided with a flange 50 which cooperates with the coupler N to obtain sealing engagement therewith. The disc holder 28 is displaced by the coupler N, again in known fashion, to space the sealing disc 22 from the valve seat 46 to open the valve for flow of liquid to the delivery tube T.

In order to reuse tote tanks, it is generally necessary to thoroughly clean both the tote tank and the outlet valve therefor. The present valve is particularly adapted to facilitate this cleaning function. To this end the bearing support for the poppet assembly 18 is readily removable through the inlet end 14 of the housing 10.

Referencing FIG. 3, it will be seen that the snap ring 44 is provided with a recess 52 at one of its ends which is spaced from the bore 40. This permits insertion of a screwdriver, or similar implement, between the bore and snap ring and lifting, or prying, of that end of the snap ring out of the groove 45. The snap ring can than be readily disengaged from the groove 45 to permit the bridge member to be slid along bore 40 and removed through the inlet end 14. The poppet assembly will either be carried with the bridge member 30, or otherwise removed through the inlet end 14.

It will be apparent that assembly of these components simply requires displacing the bridge member 30 against the action of spring 42 to a position where the snap ring 44 can be inserted into groove 45.)

It will also be noted that the described snap ring has an advantage over other types of snap (retainer) rings in that its inner diameter can be equal to or greater than the inner diameter of the rim 36 and therefore does not restrict liquid flow through the valve.

With the poppet assembly 18 and the bridge member 30 removed, the flow defining surfaces of the housing are thus accessible for cleaning. Likewise the bridge member 30 and the poppet assembly 18, as well as the spring 42 are separated so that they may be readily and thoroughly cleaned with a minimum of effort.

Cleaning of the flow defining surface of the housing 10 is further facilitated by the configuration of the groove 45. The snap ring 44 must oppose a force only in an axial direction toward the inlet end 14. The force is transmitted to a radial, annular surface 54, FIG. 4. The groove 45 then further comprises a cylindrical surface 56 and a conical annular surface 58 which, preferably is at an angle a, of 15 degrees, relative to the bore 40. The groove 45 thus has a widened opening into the bore 40 which greatly facilitates cleaning. It is to be noted that the interior, flow defining surface of the housing 10 are smoothly curved or form angles which permit cleaning with a minimum of effort.

Due to space limitations between a tote tank and its outlet conduit D, it is frequently necessary that the axis of the coupler N be angled relative to the axis of the conduit D. An angulation of about 22.5 degrees is a standard requirement in many applications.

This requirement is met in the present valve by angling the main axis of the housing, indicated by reference character 60, relative to the axis 62 of the inlet end 14. The flange 48 is formed concentrically of the axis 62, as is a portion of the exterior of the surface of the housing 10 inwardly of the flange 48, as is evident from FIG. 2. The remainder of the exterior of the housing 10, the bore 40, valve seat 46 and flange 50 are all formed concentrically of the axis 60. Preferably, the axes 60, 62 intersect, with the axis 60 being on an angle b, preferably about 22.5 degrees, relative to the axis 62.

With the outlet end of the valve thus angled relative to the discharge conduit D, attachment of the coupler N to the outlet end 16 is facilitated, or, in some cases made possible.

Variations in the described embodiment will occur to those skilled in the art within the spirit and scope of the present inventive concepts which are set forth in the following claims.

Having thus described the invention, what is claimed as novel and desired to be secured by Letters Patent of the United States is:

1. An outlet valve adapted for attachment to a tote tank having an outlet conduit comprising a unitary housing defining a fluid flow path therethrough said fluid flow path having an inlet end and an outlet end and a valve seat adjacent the outlet end of the fluid flow path, the inlet end of the fluid flow path being at an inlet end of said housing and the outlet end of the fluid flow path being at an outlet end of said housing, a poppet assembly disposed within said housing and having sealing means adapted to sealingly engage said valve seat, said poppet assembly further having a central stem extending from said sealing means towards said inlet end, a bridge member having a central hub in which said stem is slidably mounted, said bridge member further comprising an outer rim slidably received by said bore and a plurality of spokes interconnecting the rim and hub, spring means acting between said bridge member and said sealing means for urging said sealing means to a closed position in which it is in sealing engagement with said valve seat, said housing having a central bore defining the fluid flow path at its inlet end, said bridge member being slidably received in said bore from the inlet end of the fluid flow path, said inlet end of the housing having a connector flange which facilitates attachment of the valve to the oulet conduit of a tote tank, said outlet end of the housing having a coupling flange which facilitates attachment of a dry disconnect coupler to the valve, releasable means for holding said bridge member in said bore in a position in which the spring means maintains said sealing means in its closed position, said releasable means comprising a groove formed in said bore and a snap ring removably inserted in said groove, said snap ring projecting inwardly of the bore and being engaged by said rim to position the bridge member against the action of said spring means, whereby, upon release of said holding means, the internal components of the valve may be removed for cleaning thereof, as well as to enable cleaning of the flow path defining surface of the housing.

2. An outlet valve as in claim 1, wherein said groove comprises an annuler portion extending radially outwardly from said bore and the width of the opening of the groove into said bore is substantially greater than the width of the bottom of said groove.

3. An outlet valve as in claim 2, wherein said groove comprises an annular cylindrical portion and a conical portion angled downstream therefrom towards the outlet end of the fluid flow path.

4. An outlet valve as in claim 3, wherein the angle between the conical portion of said groove and said bore is approximately 15 degrees, and the inner diameter of the snap ring is at least as great than the inner diameter of said rim, and one end of the snap ring is recessed to provide a space for insertion of a prying member between the bore and the snap ring end to facilitate removal of the snap ring.

5. An outlet valve adapted for attachment to a tote tank having an outlet conduit comprising a unitary housing defining a fluid flow path therethrough said fluid flow path having an inlet end and an outlet end and a valve seat adjacent the outlet end of the fluid flow path, the inlet end of the fluid flow path being at an inlet end of said housing and the outlet end of the fluid flow path being at an outlet end of said housing, a poppet assembly disposed within said housing and having sealing means adapted to sealingly engage said valve seat, said poppet assembly further having a central stem extending from said sealing means towards said inlet end, a bridge member having a central hub in which said stem is slidably mounted, spring means acting between said bridge member and said sealing means for urging said sealing means to a closed position in which it is in sealing engagement with said valve seat, said housing having a central bore defining the fluid flow path at its inlet end, said bridge member being slidably received in said bore from the inlet end of the fluid flow path, said inlet end of the housing having a connector flange which facilitates attachment of the valve to the outlet conduit of a tote tank, said outlet end of the housing having a coupling flange which facilitates attachment of a dry disconnect coupler to the valve, a bore, said valve seat and said coupler flange being formed concentrically of a first axis, said connector flange being formed concentrically of a second axis, and said first axis being angled relative to said second axis at an angle of approximately 22.5 degrees, and releasable means for holding said bridge member in said bore in a position in which the spring means maintains said sealing means in its closed position, whereby, upon release of said holding means, the internal components of the valve may be removed for cleaning thereof, as well as to enable cleaning of the flow path defining surface of the housing.

* * * * *